United States Patent [19]
Hoisington

[11] 3,883,018
[45] May 13, 1975

[54] SPARE TIRE CARRIER

[76] Inventor: Edward C. Hoisington, 2704 Ona, Boise, Idaho 83705

[22] Filed: Apr. 29, 1974

[21] Appl. No.: 465,386

[52] U.S. Cl. .......... 214/454; 224/42.21; 224/42.24
[51] Int. Cl. .......................................... B62c 43/00
[58] Field of Search ................... 214/453, 454, 451; 224/42.21, 42.24, 42.23

[56] References Cited
UNITED STATES PATENTS

| | | | |
|---|---|---|---|
| 2,378,911 | 6/1945 | Clark | 214/453 |
| 2,489,561 | 11/1949 | Clark | 214/453 |
| 2,563,810 | 8/1951 | Ballard | 214/451 |
| 2,574,465 | 11/1951 | Clark | 214/453 |
| 3,648,867 | 3/1972 | Beavers | 214/454 |
| 3,650,424 | 3/1972 | Dumas | 214/454 |

*Primary Examiner*—Robert R. Song
*Attorney, Agent, or Firm*—Robert K. Rhea

[57] ABSTRACT

An elongated support arm is provided with a spare wheel and tire supporting pad at one end while the other end of the support arm is pivotally attached to a vehicle frame member for horizontal swinging movement of the wheel and tire from a stored position adjacent the lowermost plane of a vehicle frame to a position outward of the periphery of the vehicle. Releasable hood means supports the wheel and tire in a stored travel position.

4 Claims, 6 Drawing Figures

PATENTED MAY 13 1975 3,883,018
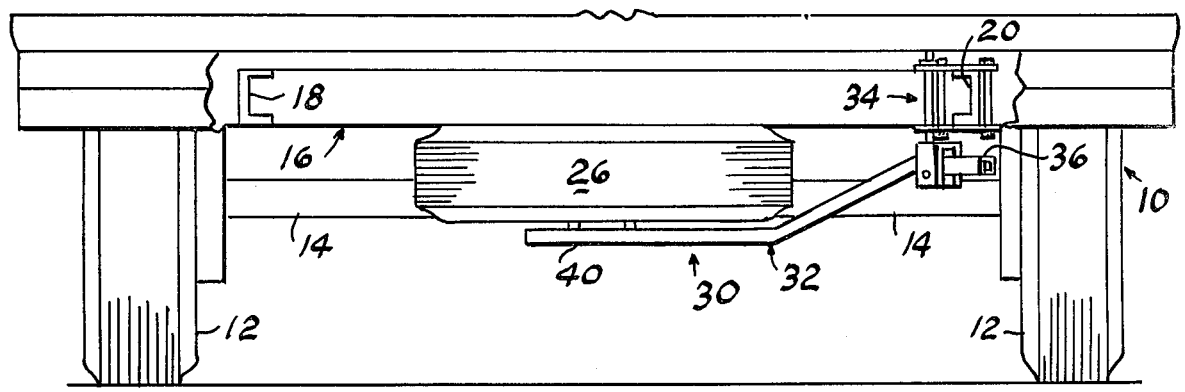
FIG.1
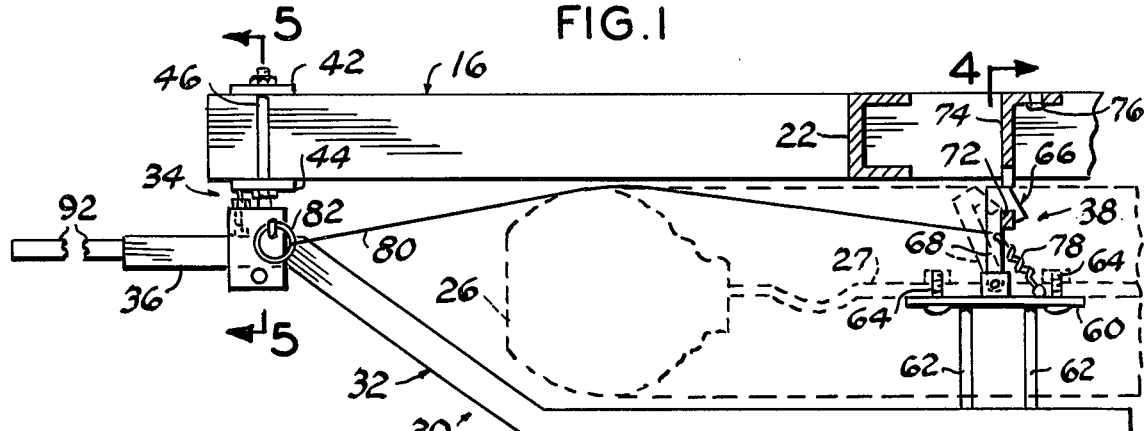
FIG.3
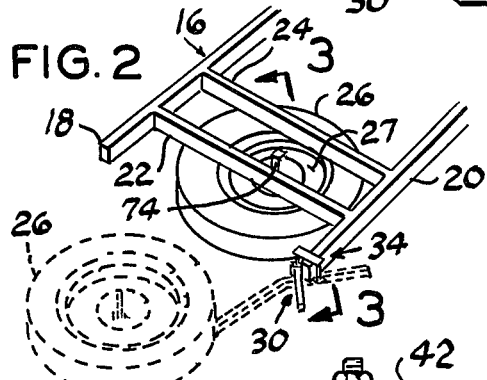
FIG.2
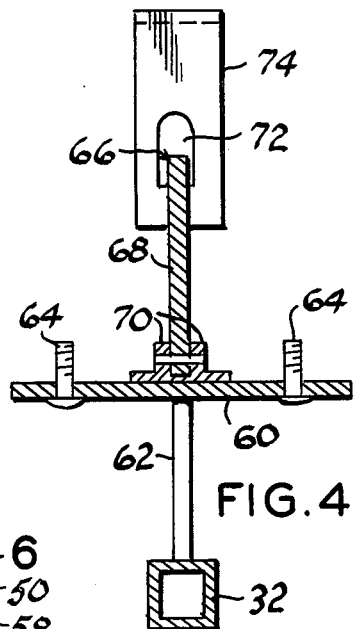
FIG.4
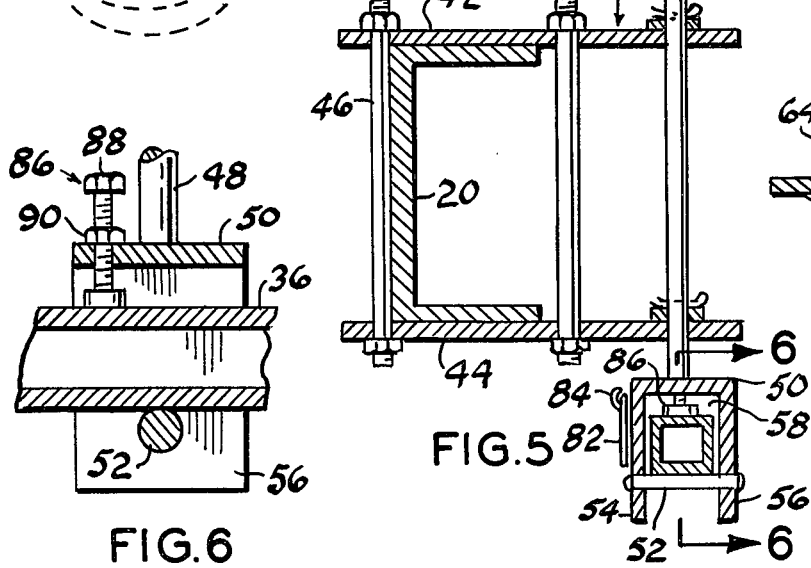
FIG.6
FIG.5

SPARE TIRE CARRIER

BACKGROUND OF THE INVENTION

1. Field of the Invention

The present invention relates to vehicle spare tire and wheel carriers and more particularly to a pickup truck spare tire carrier or rack supported underneath a pickup truck bed.

Spare tire and wheel carriers, provided by the manufacturer as original equipment, is sometimes, placed adjacent the lowermost limit of a pickup truck bed or frame rearwardly of the wheels and intermediate the spacing therebetween. This forms a satisfactory carrier or rack, however, it has the disadvantage that it is usually necessary for the operator to crawl under the pickup truck bed to store or release the spare tire.

2. Description of the Prior Art

Some of the prior art carriers involve flexible connections between the spare tire and vehicle frame for removing the tire by operating a pulley, or the like. Other prior art spare tire carriers of the swing-out type are disclosed by U.S. Pat. Nos. 2,635,795 and 3,330,431.

U.S. Pat. No. 2,635,795 discloses a horizontal swing out arm supporting a spare tire during movement toward and away from its stored position and further featuring a plurality of support hooks and a wheel center engaging expanding chuck to secure the spare tire in a stored position.

U.S. Pat. No. 3,330,431 discloses crank operated bevel gears acting on a lead screw raising and lowering a spare tire supporting swing arms.

This invention is an improvement over the above mentioned patents and other swing-out spare tire carriers by providing a spare tire support arm which is connected at one end portion with an existing vehicle frame member and is easily operated in a lever-like manner by an operator, when positioned adjacent the periphery of the vehicle, while the stored position of the spare tire is simultaneously released by the operator by remote control means.

SUMMARY OF THE INVENTION

An elongated substantially Z-shaped support arm is connected by one of its leg portions to clevis means in turn pivotally connected to the rearward end portion of a vehicle frame side member permitting vertical pivoting movement of the support arm about the axis of its connection with the clevis means and horizontal pivoting movement with the clevis means about the axis of its pivotally connected position. The other leg of the support arm projects under the vehicle frame members in horizontal downwardly spaced relation and has a wheel and tire supporting pad secured thereto provided with hook means for supporting and releasing the spare tire. The hook means is controlled by an elongated flexible element accessible to the operator near the clevis means connected position of the support arm.

The principal object of this invention is to provide a swingout type spare tire carrier for pickup trucks, or the like, which may be operated to release or store a tire from a position near the periphery of the vehicle.

BRIEF DESCRIPTION OF THE DRAWINGS

FIG. 1 is a fragmentary elevational view of a pickup truck rearward end, with parts broken away for clarity, illustrating the carrier in spare tire stored position;

FIG. 2 is a fragmentary perspective view of the rearward end portion of a pickup truck frame illustrating the spare tire in stored position and rotated to an accessible position, shown by dotted lines;

FIG. 3 is an elevational view, partially in section, taken substantially along the line 3—3 of FIG. 2 illustrating the relative position of a spare tire by dotted lines and illustrating the supporting hook in released position by dotted lines;

FIGS. 4 and 5 are vertical cross-sectional views taken substantially along the lines 4—4 and 5—5 of FIG. 3; and, FIG. 6 is a fragmentary vertical cross sectional view taken substantially along the line 6—6 of FIG. 5.

DESCRIPTION OF THE PREFERRED EMBODIMENT

Like characters of reference designate like parts in those figures of the drawings in which they occur.

In the drawings:

The reference numeral 10 indicates a vehicle, such as a pickup truck, having rearward wheels 12 and axle housings 14 supporting a vehicle frame 16 by springs, or the like, not shown. The vehicle frame 16 includes a pair of substantially parallel side members 18 and 20 interconnected by a plurality of cross members 22 and 24, only two being shown. The spacing between the frame side members 18 and 20 is greater than the diameter of a spare tire 26, mounted on a spare wheel 27, hereinafter referred to as "spare tire," while the spacing between the cross members 22 and 24 is less than the diameter of the spare tire.

The spare tire carrier or rack, indicated generally at 30, comprises an elongated partially Z-shaped support arm 32 and clevis means 34 connecting one leg 36 of the support arm to the vehicle frame side member 20. Latch means 38 connects the other end of the support arm in spare tire supporting relation to the vehicle and to the other longer end 40 of the support arm. The support arm legs 36 and 40 are disposed in parallel planes offset a distance substantially equal to the vertical thickness of the spare tire 26, as viewed in FIG. 3, for the purposes believed readily apparent.

The clevis means 34 comprises upper and lower plates 42 and 44, respectively, over and underlying the frame side member 20 adjacent its rearward limit and interconnected by bolts 46. The plates 42 and 44 preferably project inwardly of the frame side member in vertical spaced relation for pivotally supporting a vertical shaft 48 projecting therethrough and having an inverted U-shaped or clevis member 50 connected thereto. Adjacent their depending ends a clevis pin 52 pivotally projects horizontally through the clevis legs 54 and 56 defining a horizontal opening 58 which slidably receives, loosely, the arm leg portion 36. The clevis pin 52 is rigidly secured to the depending surface of the arm leg portion 36 thus forming a bearing for vertical pivoting movement of the support arm for the reasons presently apparent.

A plate or pad 60 is connected, by posts 62, to the support arm end portion 40 in vertical spaced parallel relation, as viewed in the drawings. The pad 60 is provided with a plurality of upstanding lug bolts 64 which enter lug bolt openings in the spare wheel 27.

The latch means 38 comprises an inverted substantially J-shaped hook 66 connected by its depending leg portion 68 between a pair of ears 70, secured to the pad 60, for vertical pivoting movement of the hook toward and away from an opening 72 formed in the depending end portion of a latch 74 secured at its upper end portion to the depending surface of the pickup truck bed, not shown, by a bolt or rivet 76. A spring 78, or the like, connected with the hook leg 68 and pad 60, normally biases the hook 66 toward engagement with the hook opening 72. An elongated flexible element, such as a cord or wire 80 is secured, at one end, to the hook leg 68. The other end of the wire 80 is provided with a ring 82 removably supported by a hook 84 secured to the clevis 50.

An adjustable stop means 86, comprising a bolt 88 and lock nut 90, is extended through the bight portion of the clevis 50 for engaging the upwardly disposed surface of the support arm 36. The stop means 86 is adjusted to permit the spare tire 26 to clear the pickup rear bumper and move horizontally from and toward the under surface of the frame 16 in spaced relation with respect to the surface of the earth by pivoting about the vertical axis of the shaft 48.

Operation

Assume the support arm end or leg 40 is projecting outwardly of the vehicle periphery. The spare tire 26 is horizontally positioned on the wheel pad 60 with the pull wire extending upwardly through the wheel center opening, and the wheel is secured to the lug bolts 64 by lug nuts. The spare tire is manually pushed under the vehicle, horizontally pivoting the support arm 32 about the axis of the clevis support shaft 48, until the free end of the support arm leg 36 is sufficiently exposed for telescopically receiving one end portion of an elongated handle 92. Downward pressure is manually applied to the free end portion of the handle 92 vertically pivoting the support arm leg 36 about the axis of the clevis pin 52 to lift the spare tire 26 and swing it, by further horizontal pivoting movement of the support arm, about the axis of the clevis support shaft 48 to a position under the frame 16 and adjacent the cross members 22 and 24. The hook 66 is then disposed below the latch 74 and the spare tire is moved upwardly adjacent the depending limit of the frame cross members so that the J-shaped hook enters the opening 72. The handle 92 is then removed.

The spare tire 26 is removed from its above described stored position by lifting the spare tire 26 toward the frame 16 by means of the handle 92 so that the J-hook 66 may be released from the locking bar opening 72 by pulling on the wire 80. The support arm and spare tire may then be moved outwardly of the vehicle in an action opposite to that described hereinabove for storing the spare tire.

Obviously the invention is susceptible to changes or alterations without defeating its practicability, therefore, I do not wish to be confined to the preferred embodiment shown in the drawings and described herein.

I claim:

1. A spare tire and wheel carrier for vehicles having a rearwardly projecting frame including spaced side members interconnected by spaced cross members, comprising:
    an elongated support arm;
    a wheel mounting pad secured to one end portion of said arm; latch means connecting said wheel mounting pad with the frame of a vehicle in wheel and tire stored position,
    said latch means including,
        an upstanding substantially J-shaped locking hook pivotally connected at its depending end portion with said mounting pad for vertical pivoting movement, and,
        a locking bar adapted to be vertically secured at its upper end portion with an under surface of said vehicle,
        said locking bar projecting downwardly toward said locking hook,
        said locking bar having an aperture in its depending end portion supportably receiving the J-hook shaped end portions of said locking hook; and,
    clevis means pivotally connecting the other end portion of said support arm with said vehicle frame, adjacent the periphery thereof, permitting horizontal pivoting movement of said one end portion of said support arm from a tire and wheel stored position to a position outwardly of the periphery of the vehicle,
    said clevis means including,
        clamp means connected with the rearwardly projecting end portion of one said frame side member,
        said clamp means including a pair of plates respectively overlying and underlying the respective upper and lower limits of said frame side member,
        said pair of plates cooperatively projecting laterally of said frame side member,
        a vertical shaft extending through and rotatably supported by said laterally projecting plate end portions, and,
        a clevis secured to the depending end of said shaft and straddling said support arm,
        said clevis having a pin forming a bearing for said support arm for vertical pivoting movement of said support arm about the axis of said pin.

2. The spare tire and wheel carrier according to claim 1 and further including:
    a spring normally biasing said locking hook into engagement with said locking bar; and,
    an elongated strand connected with said locking hook for pivoting the latter out of engagement with said locking bar.

3. The spare tire and wheel carrier according to claim 2 and further including:
    a stop connected with said clevis and normally contacting said support arm opposite said clevis pin.

4. The spare tire and wheel carrier according to claim 3 and further including:
    an elongated handle adapted to be connected at one end with said support arm at its end portion opposite said mounting pad.

* * * * *